United States Patent
Ichikawa

(10) Patent No.: US 9,124,126 B2
(45) Date of Patent: Sep. 1, 2015

(54) COIL UNIT, POWER TRANSMISSION DEVICE, EXTERNAL POWER FEEDING APPARATUS, AND VEHICLE CHARGING SYSTEM

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 13/983,662

(22) PCT Filed: Mar. 11, 2011

(86) PCT No.: PCT/JP2011/055813
§ 371 (c)(1),
(2), (4) Date: Aug. 5, 2013

(87) PCT Pub. No.: WO2012/124029
PCT Pub. Date: Sep. 20, 2012

(65) Prior Publication Data
US 2013/0335018 A1  Dec. 19, 2013

(51) Int. Cl.
*H02J 7/02* (2006.01)
*H01F 38/14* (2006.01)
*B60L 11/18* (2006.01)
(Continued)

(52) U.S. Cl.
CPC .................. *H02J 7/025* (2013.01); *B60L 11/14* (2013.01); *B60L 11/182* (2013.01); *B60L 11/1824* (2013.01); *B60L 11/1829* (2013.01); *B60L 11/1833* (2013.01); *H01F 38/14* (2013.01); *H04B 5/0037* (2013.01); *H04B 5/0081* (2013.01); *B60L 2210/10* (2013.01); *B60L 2210/40* (2013.01); *B60L 2270/147* (2013.01); *H02J 17/00* (2013.01); *Y02T 10/70* (2013.01); *Y02T 10/7005* (2013.01); *Y02T 10/7077* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
CPC ....................................................... H02J 7/025
USPC .......................................................... 320/108
See application file for complete search history.

(56) References Cited

U.S. PATENT DOCUMENTS

| 7,741,734 B2 | 6/2010 | Joannopoulos et al. |
| 2007/0222542 A1 | 9/2007 | Joannopoulos et al. |

(Continued)

FOREIGN PATENT DOCUMENTS

| AU | 2006269374 B2 | 1/2007 |
| AU | 2006269374 C1 | 1/2007 |

(Continued)

*Primary Examiner* — Sun Lin
(74) *Attorney, Agent, or Firm* — Oliff PLC

(57) ABSTRACT

A coil unit includes a resonant coil establishing electromagnetic field resonant coupling with an external resonant coil provided external to a vehicle. The resonant coil includes an outer side coil extending along a circumference of a first winding center, centered about the first winding center, and an extension extending from the outer side coil into a region surrounded by the outer side coil. The resonant coil is formed such that an anti-node of the resonant coil that is an area of an anti-node of AC current flowing through the resonant coil, is located at the extension when electromagnetic field resonant coupling is established between the external resonant coil and the resonant coil.

11 Claims, 14 Drawing Sheets

(51) Int. Cl.
  *H04B 5/00*   (2006.01)
  *B60L 11/14*  (2006.01)
  *H02J 17/00*  (2006.01)

(56) References Cited

U.S. PATENT DOCUMENTS

| | | |
|---|---|---|
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| EP | 2 642 497 A1 | 9/2013 |
| EP | 2 676 827 A1 | 12/2013 |
| IN | 735/DELNP/2008 | 5/2008 |
| IN | 6195/DELNP/2009 | 7/2010 |
| JP | A-2009-501510 | 1/2009 |
| JP | A-2010-073976 | 4/2010 |
| JP | A-2012-109449 | 6/2012 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2012/111088 A1 | 8/2012 |

COIL UNIT, POWER TRANSMISSION DEVICE, EXTERNAL POWER FEEDING APPARATUS, AND VEHICLE CHARGING SYSTEM

TECHNICAL FIELD

The present invention relates to a coil unit, a power transmission device, an external power feeding apparatus, and a vehicle charging system.

BACKGROUND ART

In recent years, attention is focused on hybrid vehicles and electric vehicles driving a driving wheel using electric power from a battery or the like in consideration of the environment.

Particularly in recent years, wireless charging allowing a battery to be charged in a non-contact manner without having to use a plug is attracting attention in an electrical powered vehicle incorporating the aforementioned battery. Furthermore, various charging schemes are recently proposed for charging in a non-contact manner. Particularly, attention is focused on the technique to transmit electric power in a non-contact manner by utilizing the resonance phenomenon.

For example, the vehicle and power feeding apparatus disclosed in Japanese Patent Laying-Open No. 2010-73976 each include a communication coil. The communication coil mounted on the vehicle includes a resonant coil and a power receiving coil. The communication coil mounted on the power feeding apparatus includes a resonant coil and a power feeding coil. Between the resonant coil mounted on the power feeding apparatus and the resonant coil mounted on the vehicle, electric power is transmitted in a non-contact manner utilizing the resonance phenomenon.

CITATION LIST

Patent Document

PTD 1: Japanese Patent Laying-Open No. 2010-73976

SUMMARY OF INVENTION

Technical Problem

During the non-contact power transmission between a vehicle and power feeding apparatus disclosed in Japanese Patent Laying-Open No. 2010-73976, a high frequency current of high voltage flows through each resonant coil to develop a magnetic field of high intensity around each resonant coil. As a result, a magnetic field of high intensity may leak around the vehicle during power transmission.

In view of the problem set forth above, an object of the present invention is to provide a coil unit that can suppress leakage of a magnetic field of excessively high intensity around the coil unit, a power transmission device, an external power feeding apparatus, and a vehicle charging system.

Solution to Problem

A resonant coil according to the present invention establishes electromagnetic field resonant coupling with an externally provided external resonant coil. The resonant coil includes an outer side coil extending along a circumference of a first winding center, centered about the first winding center, and an extension extending from the outer side coil into a region surrounded by the outer side coil. The resonant coil is formed such that an anti-node of the resonant coil that is an area of an anti-node of AC current flowing through the resonant coil is located at the extension, when electromagnetic field resonant coupling is established between the external resonant coil and the resonant coil.

Preferably, the resonant coil includes an inner side coil formed in a loop, whose direction of a magnetic field developed by a flow of current is identical to the direction of the magnetic field developed by the outer side coil. The extension is the inner side coil. Preferably, a plurality of inner side coils are provided spaced apart along the outer side coil. The anti-node is located at one of the plurality of inner side coils.

Preferably, the inner side coil extends along a circumference of a second winding center. The second winding center is located at a position distant from the first winding center. The resonant coil is formed such that the anti-node is located closer to the first winding center than the second winding center. Preferably, the resonant coil includes a first end and a second end. There is also included a capacitor connected to the first end and second end. The anti-node is located at a middle of a conductor wire constituting the resonant coil, in a length direction from one end to the other end of the conductor wire.

Preferably, the resonant coil includes an inner side coil formed in a loop, whose direction of a magnetic field developed by a flow of current is identical to the direction of the magnetic field developed by the outer side coil. A plurality of the inner side coils are provided spaced apart along the outer side coil. The plurality of inner side coils include a first inner side coil where the anti-node of the resonant coil is located, and a second inner side coil including a first end and a second end, and to which the capacitor is connected.

Preferably, a resonant circuit is formed by the resonant coil and capacitor. The anti-node is located at a center of a current path of the resonant circuit. Preferably, there is also included an electromagnetic induction coil establishing electromagnetic induction coupling with the resonant coil. A vehicle according to the present invention includes the above-described coil unit. The distance between the anti-node of the resonant coil and the center of the vehicle is smaller than the distance between the first winding center and the center of the vehicle. An external power feeding apparatus according to the present invention includes the coil unit set forth above. A vehicle power charging system according to the present invention includes the vehicle set forth above, and the external power feeding apparatus set forth above.

Advantageous Effects of Invention

According to the coil unit, the power transmission device, the external power feeding apparatus, and the vehicle charging system of the present invention, leakage of a magnetic field of excessive high intensity towards the surrounding region can be suppressed.

DESCRIPTION OF EMBODIMENTS

A vehicle and an external power feeding apparatus according to a first embodiment of the present invention will be described with reference to FIGS. 1-23.

Figure 1:
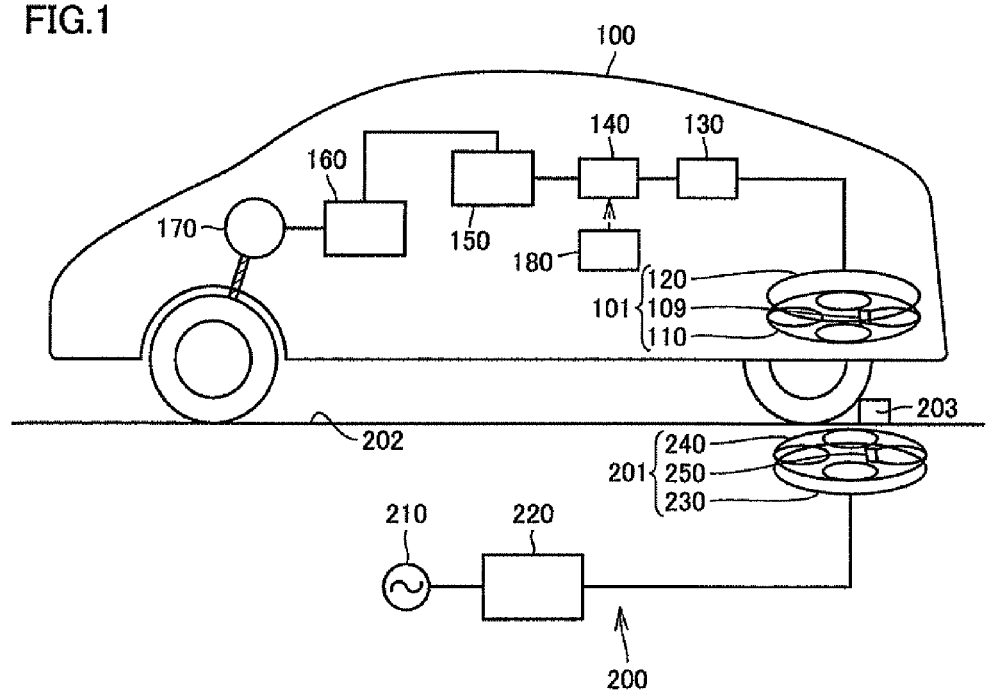
FIG. 1 schematically represents a vehicle 100 and an external power feeding apparatus 200 feeding electric power to vehicle 100 according to a first embodiment.

FIG. 1 is a schematic diagram of a vehicle 100 and an external power feeding apparatus 200 for feeding electric power to vehicle 100 according to the first embodiment of the present invention.

Vehicle 100 parks at a predetermined position in a parking space 202 where external power feeding apparatus 200 is provided to receive electric power mainly from external power feeding apparatus 200. Vehicle 100 can supply electric power to external power feeding apparatus 200.

At parking space 202, a wheel block 203 and lines are provided for vehicle 100 to park at the predetermined position.

External power feeding apparatus 200 includes a high frequency power driver 220 connected to an AC source 210, and a facility coil unit 201 connected to high frequency power driver 220. Facility coil unit 201 functions mainly as a non-contact power transmission device, and includes a facility resonant coil 240, a facility capacitor 250 connected to facility resonant coil 240, and a facility electromagnetic induction coil 230 electrically connected to facility resonant coil 240.

AC source 210 is a source external to the vehicle such as a system power supply. High frequency power driver 220 converts the electric power received from AC source 210 into electric power of high frequency, and supplies the converted high frequency power to facility electromagnetic induction coil 230. The frequency of the high frequency power generated by high frequency power driver 220 is, for example, 1 MHz to several ten MHz.

Facility electromagnetic induction coil 230 has the aforementioned high frequency power supplied such that the amount of magnetic flux generated from facility electromagnetic induction coil 230 varies over time.

Facility resonant coil 240 is coupled in an electromagnetic-induction manner with facility electromagnetic induction coil 230. The change in the amount of magnetic flux from facility resonant coil 240 causes a current of high frequency to also flow through facility resonant coil 240 by electromagnetic induction.

Current is supplied to facility electromagnetic induction coil 230 such that the frequency of the high frequency current flowing through facility resonant coil 240 substantially matches the resonant frequency determined by the reluctance of facility electromagnetic induction coil 230 and the capacitance C of facility capacitor 250. Facility resonant coil 240 and facility capacitor 250 function as an LC resonator.

Around facility resonant coil 240, an electric field and magnetic field of a frequency substantially equal to the relevant resonant frequency are developed. Thus, an electromagnetic field of a predetermined frequency is developed around facility resonant coil 240.

Vehicle 100 includes an LC resonator having a resonant frequency identical to that of the LC resonator formed by facility resonant coil 240 and facility capacitor 250. By the relevant LC resonator and the LC resonator formed by facility resonant coil 240 and facility capacitor 250 establishing electromagnetic field resonant coupling, electric power is transmitted from external power feeding apparatus 200 to vehicle 100.

Vehicle 100 and external power feeding apparatus 200 take advantage of mainly the near field (evanescent field) among the electromagnetic field developed by facility resonant coil 240 and facility capacitor 250 to cause supply of electric power from the side of external power feeding apparatus 200 towards vehicle 100. Details of the wireless power transmission/reception method utilizing the electromagnetic resonance method will be described afterwards.

Vehicle 100 includes a vehicle coil unit 101 mainly functioning as a non-contact power reception device, a rectifier 130 connected to vehicle coil unit 101, a DC/DC converter 140 connected to rectifier 130, a battery 150 connected to DC/DC converter 140, a power control unit (PCU) 160, a motor unit 170 connected to power control unit 160, and a vehicle ECU (Electronic Control Unit) 180 controlling the driving of DC/DC converter 140, power control unit 160, and the like.

Although vehicle 100 of the present embodiment is a hybrid vehicle with an engine not shown, any vehicle driven by a motor such as an electric vehicle and fuel cell vehicle is intended to be included.

Vehicle coil unit 101 includes a vehicle resonant coil 110, a vehicle capacitor 109 connected to vehicle resonant coil 110, and a vehicle electromagnetic induction coil 120 coupled with vehicle resonant coil 110 by electromagnetic induction. Details of the configuration of vehicle coil unit 101 will be described afterwards.

Vehicle resonant coil 110 and vehicle capacitor 109 constitute an LC resonator. The resonant frequency of the LC resonator formed by vehicle resonant coil 110 and vehicle capacitor 109 substantially matches the resonant frequency of the LC resonator formed by facility resonant coil 240 and facility capacitor 250.

When a high frequency current having a frequency identical to the resonant frequency of the relevant LC resonator is supplied to facility resonant coil 240, an electromagnetic field having a frequency equal to the relevant resonant frequency is developed.

When vehicle resonant coil 110 is arranged within a range of approximately several meters, for example, from facility resonant coil 240, the LC resonator formed by vehicle resonant coil 110 and vehicle capacitor 109 resonates to cause current to flow through vehicle resonant coil 110. Thus, vehicle resonant coil 110 and facility resonant coil 240 establish electromagnetic field resonant coupling.

Vehicle electromagnetic induction coil 120 establishes electromagnetic induction coupling with vehicle resonant coil 110 to draw out the electric power received at vehicle resonant coil 110. The sequential output of electric power from vehicle resonant coil 110 by vehicle electromagnetic induction coil 120 causes electric power to be supplied sequentially from facility resonant coil 240 to vehicle resonant coil 110 through the electromagnetic field. As such, vehicle coil unit 101 and facility coil unit 201 employ the wireless power transmission/reception method of the so-called electromagnetic resonance scheme.

Rectifier 130 is connected to vehicle electromagnetic induction coil 120 to convert AC current supplied from vehicle electromagnetic induction coil 120 into DC current for supply to DC/DC converter 140.

DC/DC converter 140 adjusts the voltage of the DC current from rectifier 130 and supplies the adjusted DC current to battery 150.

Power control unit 160 includes a converter connected to battery 150, and an inverter connected to this converter. The converter adjusts (boosts) the DC current from battery 150 for supply to the inverter. The inverter converts the DC current from the converter into AC current for supply to motor unit 170.

Motor unit 170 includes, for example, a 3-phase AC motor or the like, and is driven by the AC current supplied from the inverter of power control unit 160.

In the supplying step of the electric power stored in battery 150 to AC source 210, DC/DC converter 140 boosts the current from battery 150, for example, to supply the boosted current to rectifier 130. Rectifier 130 converts the DC current from DC/DC converter 140 into high frequency current. The frequency of the high frequency current is equal to the aforementioned resonant frequency.

Rectifier 130 supplies the high frequency current to vehicle electromagnetic induction coil 120. Vehicle resonant coil 110 receives the high frequency current from vehicle electromagnetic induction coil 120 by electromagnetic induction. The frequency of this high frequency current substantially matches the resonant frequency. The LC resonator formed by vehicle resonant coil 110 and vehicle capacitor 109 resonates. Then, an electromagnetic field having a frequency equal to the aforementioned resonant frequency is developed around vehicle resonant coil 110.

By arranging facility resonant coil 240 within the range of approximately several meters, for example, from vehicle resonant coil 110, the LC resonator formed by facility resonant coil 240 and facility capacitor 250 resonates. The electric power supplied to facility resonant coil 240 is drawn out to facility electromagnetic induction coil 230 through electromagnetic induction. The electric power drawn out to facility resonant coil 240 passes through high frequency power driver 220 to be supplied to AC source 210.

In the case where vehicle 100 is a hybrid vehicle, vehicle 100 further includes an engine and a power split mechanism. Motor unit 170 includes a motor generator functioning mainly as a power generator, and a motor generator functioning mainly as an electric motor.

A wireless power transmission/reception scheme based on a resonance method taking advantage of an electromagnetic field is employed between vehicle coil unit 101 and facility coil unit 201 according to the first embodiment, as mentioned above.

Figure 2:
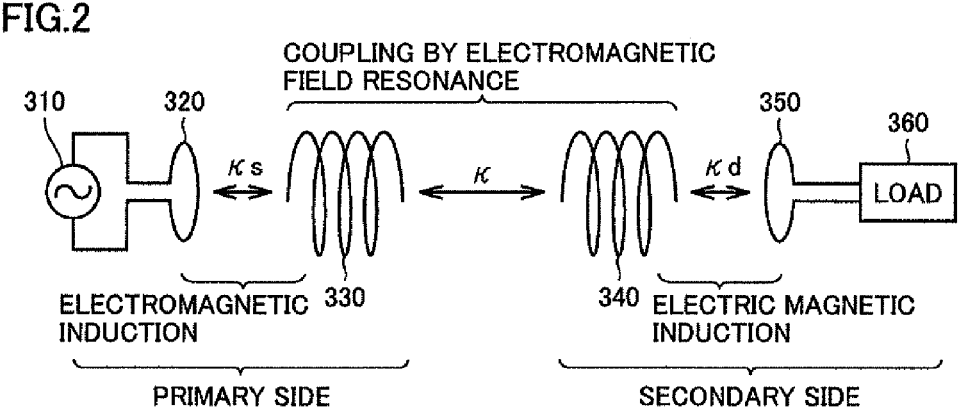
FIG. 2 is a schematic diagram to describe the mechanism of power transmission and power reception by a resonance method.

FIG. 2 is a schematic diagram to describe the mechanism of power transmission and reception by the resonant method. The mechanism of power transmission and power reception by the resonant method will be described based on FIG. 2.

Referring to FIG. 2, the resonance method is similar to the resonance of two tuning forks. By the resonance of two LC resonant coils having the same natural frequency at the electromagnetic field (near field), electric power is transferred from one coil to the other coil via the electromagnetic field.

Specifically, a primary coil 320 is connected to high frequency power source 310, and electric power of a frequency as high as 1 MHz to several ten MHz is supplied to primary self-resonant coil 330 that is magnetically coupled with primary coil 320 by electromagnetic induction. Primary self-resonant coil 330 is an LC resonator based on the coil's inductance and floating capacitance (when a capacitor is connected to the coil, including the capacitance of the capacitor), resonating with a secondary self-resonant coil 340 having the same resonant frequency as primary self-resonant coil 330 via an electromagnetic field (near field). Accordingly, energy (electric power) is transferred from primary self-resonant coil 330 to secondary self-resonant coil 340 via the electromagnetic field. The energy (electric power) transferred to secondary self-resonant coil 340 is extracted by secondary coil 350 magnetically coupled with secondary self-resonant coil 340 through electromagnetic induction to be provided to a load 360. Power transmission by the resonance method is realized when the Q value representing the resonance strength between primary self-resonant coil 330 and secondary self-resonant coil 340 is higher than 100, for example.

As to the corresponding relationship between the configuration of FIG. 2 and the configuration of FIG. 1, AC source 210 and high frequency power driver 220 shown in FIG. 1 correspond to high frequency power source 310 of FIG. 2. Facility electromagnetic induction coil 230 of FIG. 1 corresponds to primary coil 320 of FIG. 2. Further, facility resonant coil 240 and facility capacitor 250 of FIG. 1 correspond to primary self-resonant coil 330 of FIG. 2 and the floating capacitance of primary self-resonant coil 330.

Vehicle resonant coil 110 and vehicle capacitor 109 of FIG. 1 correspond to secondary self-resonant coil 340 of FIG. 2 and the floating capacitance of secondary self-resonant coil 340.

Vehicle electromagnetic induction coil 120 of FIG. 1 corresponds to secondary coil 350 of FIG. 2. Rectifier 130, DC/DC converter 140 and battery 150 of FIG. 1 correspond to load 360 of FIG. 2.

The wireless power transmission/reception scheme according to the first embodiment aims to improve the power transmission and reception efficiency by utilizing the near field (evanescent field) where "electrostatic field" of the electromagnetic field is dominant.

Figure 3:
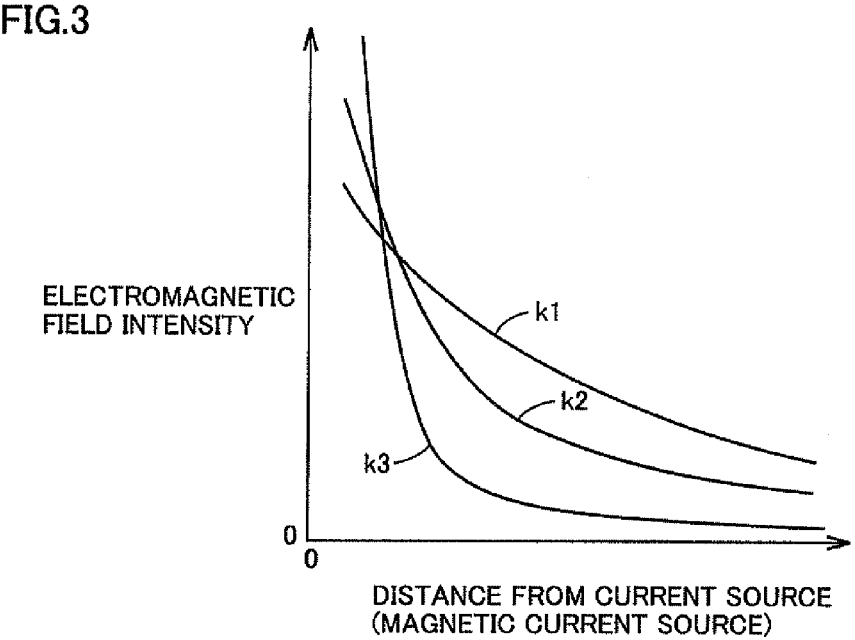
FIG. 3 represents the relationship between the distance from a current source (magnetic current source) and electromagnetic field intensity.

FIG. 3 represents the relationship between the distance from the current source (magnetic current source) and the electromagnetic field intensity. Referring to FIG. 3, the electromagnetic field is composed of three components. Curve k1 represents a component inversely proportional to the distance from the wave source, and is referred to as "radiation electric field". Curve k2 represents a component inversely proportional to the square of the distance from the wave source, and is referred to as "induction electric field". Curve k3 represents a component inversely proportional to the cube of the distance from the wave source, and is referred to as "electrostatic field".

"Electrostatic field" is a region where the intensity of the electromagnetic wave decreases drastically according to the distance from the wave source. In the resonance method, energy (electric power) is transmitted taking advantage of the near field (evanescent field) where this "electrostatic field" is dominant. Specifically, a pair of resonators (for example, a pair of LC resonant coils) having the same natural frequency is caused to resonate in the near field where "electrostatic field" is dominant, whereby energy (electric power) is transferred from one resonator (primary resonant coil) to the other resonator (secondary resonant coil). Since the "electrostatic field" does not pass on energy far away, the resonance method allows power to be transmitted with lower energy loss as compared to an electromagnetic wave that transmits energy (electric power) by the "radiation electric field" that passes on energy over a great distance.

Thus, vehicle 100 and external power feeding apparatus 200 of the first embodiment take advantage of the resonance at the near field of the electromagnetic field to carry out transmission and reception of electric power between vehicle coil unit 101 of vehicle 100 and facility coil unit 201 of external power feeding apparatus 200.

Leakage of a high magnetic field around the vehicle during transmission and reception of electric power between vehicle coil unit 101 and facility coil unit 201 may adversely affect electrical devices around vehicle 100.

As a result of diligent study, the inventors of the present application found out that a magnetic field of particularly high intensity is developed at the circumference of a particular portion of vehicle resonant coil 110 and a particular portion of facility resonant coil 240 during power reception and transmission. The invention of the present application is directed to suppressing leakage of a magnetic field of high intensity around vehicle 100 during the process of power reception and power transmission. A specific configuration therefor will be described hereinafter.

Figure 4:
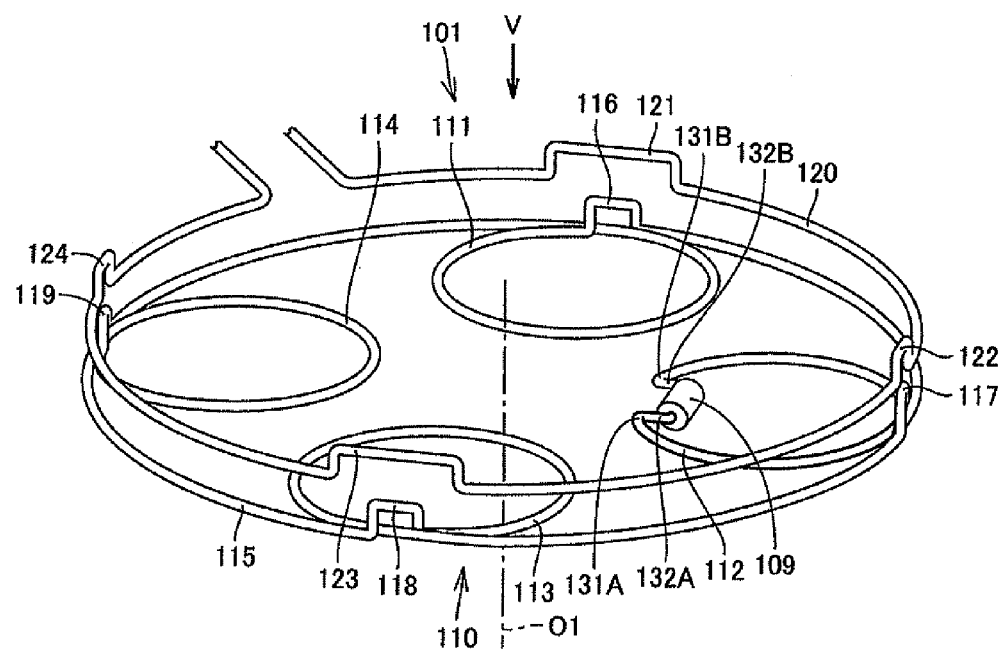
FIG. 4 is a perspective view schematically representing a vehicle coil unit 101 mounted on a vehicle.

FIG. 4 is a perspective view schematically representing vehicle coil unit 101 mounted on the vehicle. As shown in FIG. 4, vehicle coil unit 101 includes vehicle resonant coil 110, vehicle electromagnetic induction coil 120, vehicle capacitor 109 connected to vehicle resonant coil 110, and connection wirings 132A and 132B connecting vehicle capacitor 109 and vehicle resonant coil 110.

Vehicle resonant coil 110 includes an end 131A to which connection wiring 132A is connected, and an end 131B to which connection wiring 132B is connected. By connection wirings 132A and 132B, vehicle capacitor 109 and vehicle resonant coil 110 are connected in series. In the example shown in FIG. 4, connection wirings 132A and 132B are formed integrally with vehicle resonant coil 110. Specifically, the coil wire constituting vehicle resonant coil 110 is bent at ends 131A and 131B to form connection wirings 132A and 132B.

Figure 5:
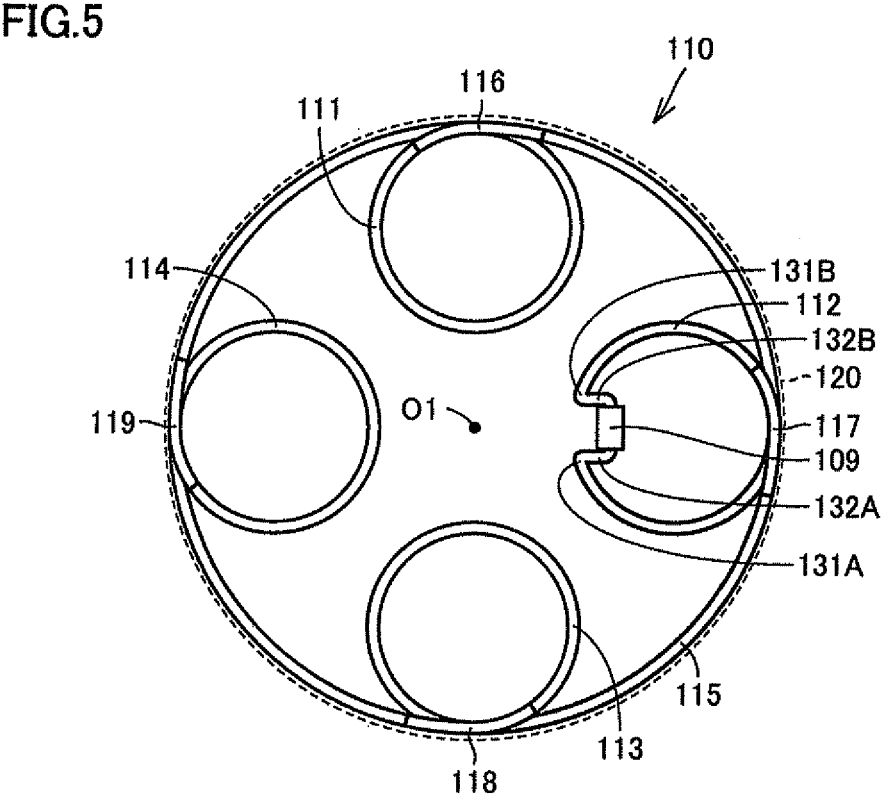
FIG. 5 is a plan view of a vehicle resonant coil 110 and a vehicle electromagnetic induction coil 120 viewed from the direction of V shown in FIG. 4.

FIG. 5 is a plan view of vehicle resonant coil 110 and vehicle electromagnetic induction coil 120 viewed from the direction of V indicated in FIG. 4. In FIG. 5, vehicle electromagnetic induction coil 120 is indicated by a broken line. Vehicle resonant coil 110 is arranged below vehicle electromagnetic induction coil 120, as shown in FIGS. 5 and 4. Vehicle resonant coil 110 includes an outer side coil 115 extending along a circumference of a winding center line O1, a plurality of inner side coils 111, 112, 113 and 114 connected to outer side coil 115 and arranged within a region surrounded by outer side coil 115, and a plurality of crossovers 116, 117, 118 and 119.

Outer side coil 115 and vehicle electromagnetic induction coil 120 are arranged such that they overlap when viewed in the direction towards the center point of outer side coil 115 from any position on winding center line O1.

In other words, outer side coil 115 and vehicle electromagnetic induction coil 120 are formed such that one extends in accordance with the other.

Transmission and reception of current between vehicle resonant coil 110 and vehicle electromagnetic induction coil 120 are implemented by electromagnetic induction.

By the overlapping arrangement of outer side coil 115 and vehicle electromagnetic induction coil 120, many of the lines of magnetic force generated by the flow of current to vehicle resonant coil 110 pass through vehicle electromagnetic induction coil 120 during the transfer of current between vehicle resonant coil 110 and vehicle electromagnetic induction coil 120. Accordingly, great electromotive force is generated at vehicle electromagnetic induction coil 120 to cause favorable transmission and reception of current between vehicle resonant coil 110 and vehicle electromagnetic induction coil 120.

Outer side coil 115 is formed to extend along a circumference of winding center line O1. Inner side coils 111, 112, 113 and 114 are arranged spaced apart from each other in the circumferential direction of outer side coil 115. Inner side coils 111, 112, 113 and 114 are aligned in a loop at the circumference of winding center line O1. The winding center of each of inner side coils 111, 112, 113 and 114 is located equally spaced along the circumference of winding center line O1. Inner side coils 111, 112, 113 and 114 are arranged in an inscribed manner to the inner perimeter of outer side coil 115. Accordingly, a large diameter can be ensured for each of inner side coils 111, 112, 113 and 114, allowing the power reception and power transmission efficiency to be improved.

Ends 131A and 131B of vehicle resonant coil 110 are located at inner side coil 112 to which vehicle capacitor 109 is connected.

Vehicle resonant coil 110 is formed of one conductor wire. Outer side coil 115, inner side coils 111, 112, 113, 114 and crossovers 116, 117, 118 and 119 are formed integrally from one conductor wire.

By the formation of vehicle resonant coil 110 through one conductor wire, vehicle electromagnetic induction coil 120 effecting transmission and reception of electric power to and from vehicle resonant coil 110 can be consolidated into one, allowing the number of components to be reduced. Outer side coil 115 and inner side coils 111, 112, 113 and 114 are formed of one winding of a coil to allow vehicle resonant coil 110 to be compact.

Figure 6:
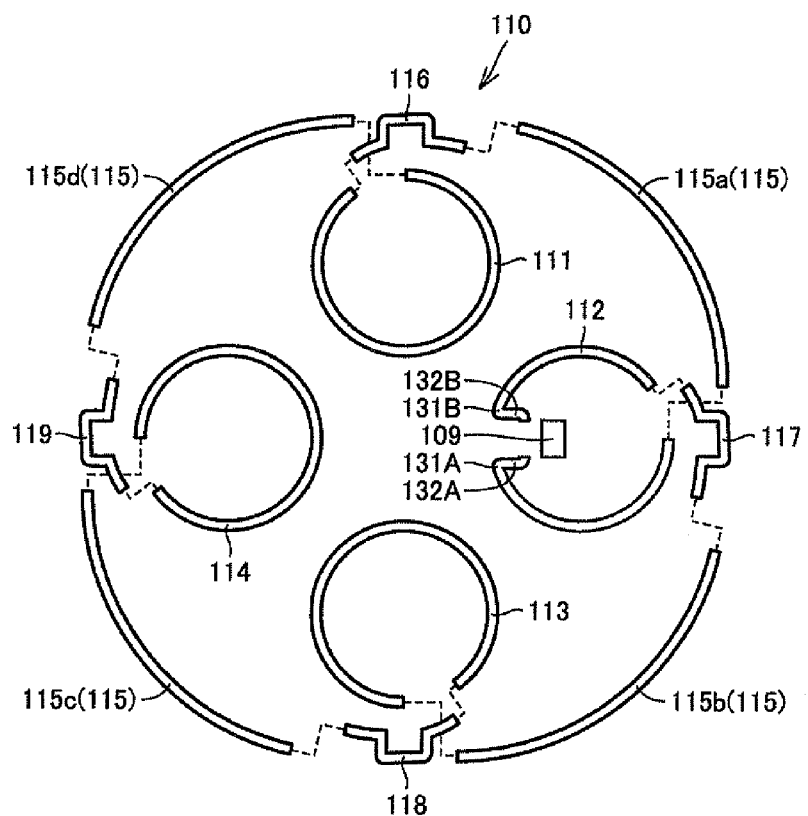
FIG. 6 is an exploded view to describe in detail vehicle resonant coil 110.

FIG. 6 is an exploded view to describe vehicle resonant coil 110 in detail, corresponding to a cut out of each constituent element thereof.

As shown in FIG. 6, outer side coil 115 includes a plurality of arcs 115a-115d. Each of arcs 115a-115d is formed to extend in a manner constituting a circle, centered about winding center line O1 shown in FIGS. 4 and 5.

The shape of outer side coil 115 is not limited to a circle, and may take various shapes such as a rectangle, a polygon and an ellipse.

Similarly, inner side coils 111, 112, 113, and 114 take substantially a circle shape. However, the shape thereof is not limited to a circle, and may take various shapes such as a rectangle, a polygon and an ellipse. Each center line of inner side coils 111, 112, 113 and 114 is distant from winding center line O1, and aligned about winding center line O1.

Crossovers 116, 117, 118 and 119 connect inner side coils 111, 112, 113 and 114 with arcs 115a, 115b, 115c and 115d.

Crossover 116 connects one end of arc 115a with one end of inner side coil 111. The other end of arc 115a is connected to one end of inner side coil 112.

Crossover 117 connects the other end of inner side coil 112 with one end of arc 115b. The other end of arc 115b is connected to one end of inner side coil 113. Crossover 118 connects the other end of inner side coil 113 with one end of arc 115c. The other end of arc 115c is connected to one end of inner side coil 114. Crossover 119 connects the other end of inner side coil 114 with one end of arc 115d. The other end of arc 115d is connected to the other end of inner side coil 111.

Although FIG. 6 shows an exploded state of vehicle resonant coil 110 for the sake of describing vehicle resonant coil 110, vehicle resonant coil 110 is formed of one conductor wire.

Figure 7:
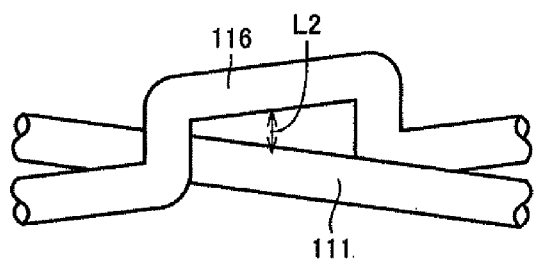
FIG. 7 is a perspective view of a configuration of a crossover 116 and the neighborhood.

FIG. 7 is a perspective view showing the configuration of crossover 116 and the neighborhood thereof. Crossover 116 is formed to bridge over inner side coil 111 that is a portion of vehicle resonant coil 110, as shown in FIGS. 7 and 4.

Crossover 116 is bent to bulge towards vehicle electromagnetic induction coil 120. The remaining crossovers 117, 118 and 119 are also formed in a manner corresponding to crossover 116 so as to bridge over a portion of vehicle resonant coil 110.

The distance L2 from each of crossovers 116, 117, 118 and 119 to a portion of vehicle resonant coil 110 is set greater than, for example, the diameter of the conductor wire constituting vehicle resonant coil 110 to suppress the occurrence of discharge between crossovers 116, 117, 118, 119 and vehicle resonant coil 110.

Figure 8:
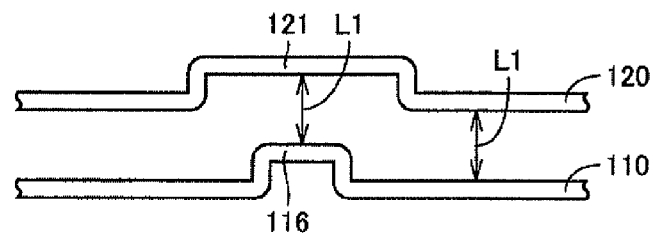
FIG. 8 is a side view partially representing vehicle resonant coil 110 and vehicle electromagnetic induction coil 120.

FIG. 8 is a partial side view of vehicle resonant coil 110 and vehicle electromagnetic induction coil 120. As shown in FIG. 8, vehicle electromagnetic induction coil 120 includes a bent section 121 extending along crossover 116.

Bent section 121 is bent such that the distance L1 between bent section 121 and crossover 116 is equal to the distance between the remaining portion of vehicle electromagnetic induction coil 120 and vehicle resonant coil 110.

Vehicle electromagnetic induction coil 120 also includes bent sections 122, 123 and 124 extending along crossovers 117, 118, and 119, respectively, of vehicle resonant coil 110, as shown in FIG. 4.

Accordingly, vehicle electromagnetic induction coil 120 and vehicle resonant coil 110 are formed such that the distance therebetween corresponds to a constant distance L1 along the entire perimeter.

Since there is no area where the distance between vehicle resonant coil 110 and vehicle electromagnetic induction coil 120 becomes shorter, occurrence of discharge between vehicle resonant coil 110 and vehicle electromagnetic induction coil 120 can be suppressed, even if current of high voltage flows thereto.

Furthermore, electromotive force can be generated favorably at vehicle resonant coil 110 by maintaining a constant distance between vehicle electromagnetic induction coil 120 and vehicle resonant coil 110, allowing favorable transfer of electric power between vehicle resonant coil 110 and vehicle electromagnetic induction coil 120.

Figure 9:
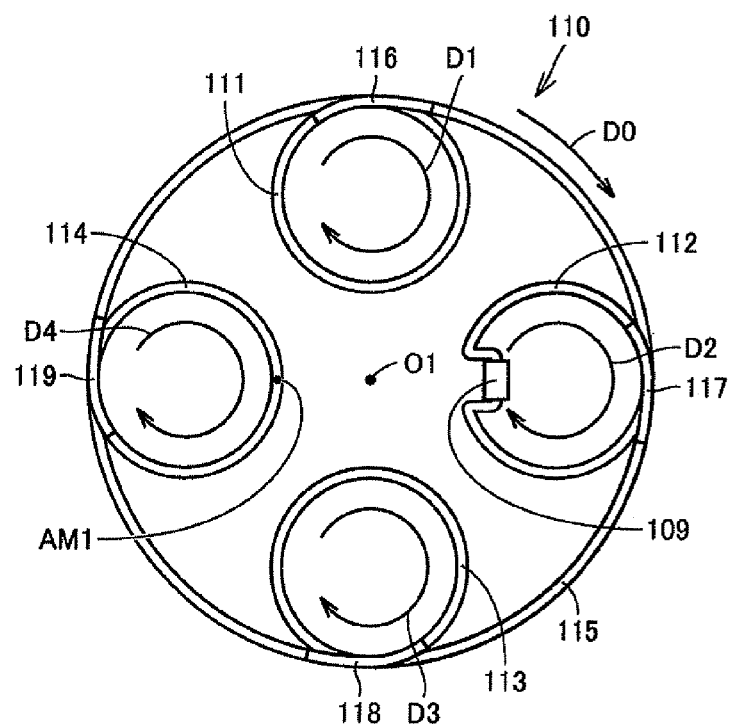
FIG. 9 is a schematic view representing a state when current flows through vehicle resonant coil 110.

FIG. 9 schematically represents a state when current flows to vehicle resonant coil 110. As shown in FIG. 9, current flows in a current direction D0 at outer side coil 115 when current flows through vehicle resonant coil 110. Current flows in current directions D1, D2, D3 and D4 at inner side coils 111, 112, 113, and 114, respectively.

The flow of current in the aforementioned directions at outer side coil 115 and inner side coils 111, 112, 113 and 114 causes development of a magnetic field thereby. Outer side coil 115 and inner side coils 111, 112, 113 and 114 are wound such that the magnetic field developed by outer side coil 115 and inner side coils 111, 112, 113 and 114 is all directed to the same direction.

Figure 10:
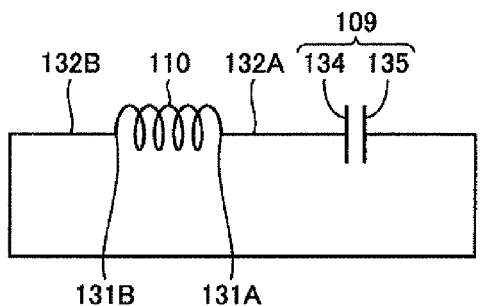
FIG. 10 is a circuit diagram schematically representing vehicle resonant coil 110 and vehicle capacitor 109 configured as shown in FIG. 9.

FIG. 10 is a circuit diagram schematically representing vehicle resonant coil 110 and vehicle capacitor 109 configured as set forth above. In FIG. 10, vehicle capacitor 109 includes electrodes 134 and 135 facing each other. By connection wirings 132A and 132B, electrodes 134 and 135 are connected to ends 131A and 131B, respectively, of vehicle resonant coil 110.

Figure 11:
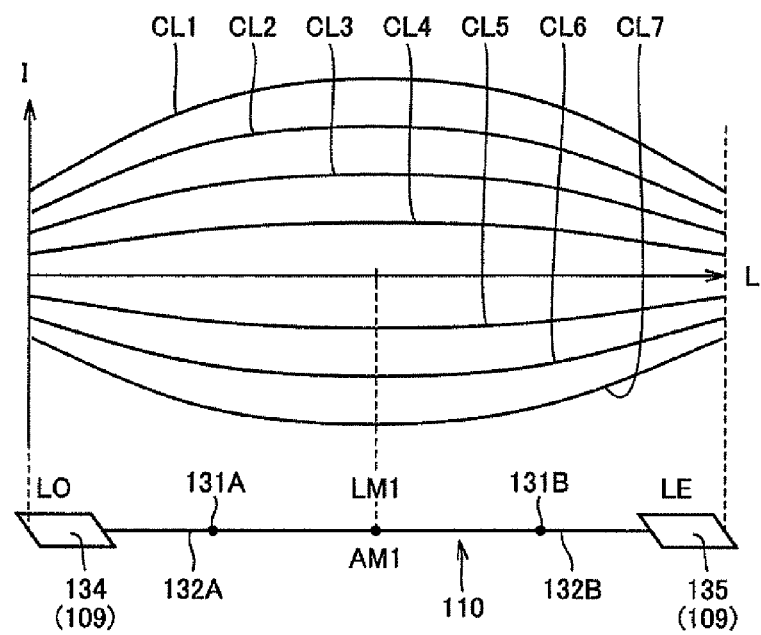
FIG. 11 represents the development of an LC resonator formed by vehicle resonant coil 110, vehicle capacitor 109 and connection wirings 132A and 113, and a graph indicating the value of current flowing in the resonant circuit.

During electromagnetic field coupling (electromagnetic field resonance) between facility resonant coil 240 and vehicle resonant coil 110, AC current of high frequency flows through a current path formed by vehicle resonant coil 110, vehicle capacitor 109, and connection wirings 132A, 132B. The frequency of the AC current substantially matches the resonant frequency of the LC resonant circuit. The relevant AC current takes a resonating state. FIG. 11 represents the development of an LC resonator formed by vehicle resonant coil 110, vehicle capacitor 109 and connection wirings 132A, 132B, and a graph indicating the value of current flowing in the resonant circuit.

In FIG. 11, an end of electrode 134 is taken as a circuit origin LO of the resonant circuit, and an end of electrode 135 is taken as a circuit end LE of the resonant circuit.

In FIG. 11, the vertical axis corresponds to the amount of current and the horizontal axis represents the location of the resonant circuit. Curve CL1 represents the distribution of the current amount at an arbitrary point in time when electromagnetic field resonant coupling is established. Curves CL2-CL7 represent the distribution of the current amount that changes from time to time from the point in time of curve CL1.

As apparent from curves CL1-CL7, the area of a middle position LM1 is the "anti-node" of the current flowing in the resonant circuit. The distance from the connecting position of connection wiring 132A and electrode 134 to circuit origin LO is substantially equal to the distance from the connecting position of electrode 135 and connection wiring 132B to circuit end LE. Furthermore, the length of connection wiring 132A is equal to the length of connection wiring 132B. Therefore, middle position LM1 is located at the middle of the conductor wire constituting vehicle resonant coil 110 in the length direction. Such a resonant AC current is highest at the area of the "anti-node". The area of vehicle resonant coil 110 corresponding to the "anti-node" of the resonant AC current is referred to as anti-node AM1.

Since the current flowing through anti-node AM1 of vehicle resonant coil 110 is at the maximum level, a magnetic field of high intensity is developed around anti-node AM1. The intensity of the magnetic field developed around vehicle resonant coil 110 becomes smaller as a function of approaching the end side of vehicle resonant coil 110.

Since the potential at circuit origin LO and circuit end LE is high whereas the potential at anti-node AM1 is low, the electric field intensity is increased around circuit origin LO and circuit end LE1 whereas the electric field intensity is lowest around anti-node AM1 of vehicle resonant coil 110.

Figure 12:
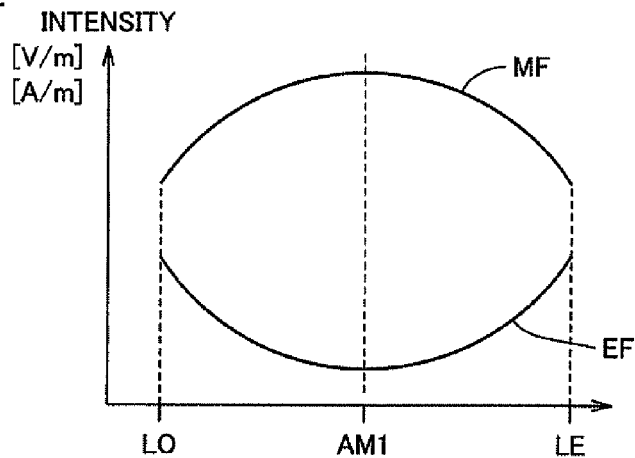
FIG. 12 is a graph schematically representing the location of a resonant circuit and the intensity of an electric field EF and a magnetic field MF developed around the location.

FIG. 12 is a graph schematically representing the position of the resonant circuit and the intensity of the electric field EF and magnetic field MF developed around the relevant position. It is apparent from FIG. 12 that a magnetic field of high intensity is developed around anti-node AM1 of vehicle resonant coil 110.

Although a resonant circuit including vehicle resonant coil 110 has been described in FIGS. 11 and 12, a current distribution, a magnetic field intensity distribution, and electric field intensity distribution similar to those of the LC resonant circuit including vehicle resonant coil 110 are exhibited in the LC resonant circuit formed by facility resonant coil 240, facility capacitor 250, and connection wirings.

Figure 13:
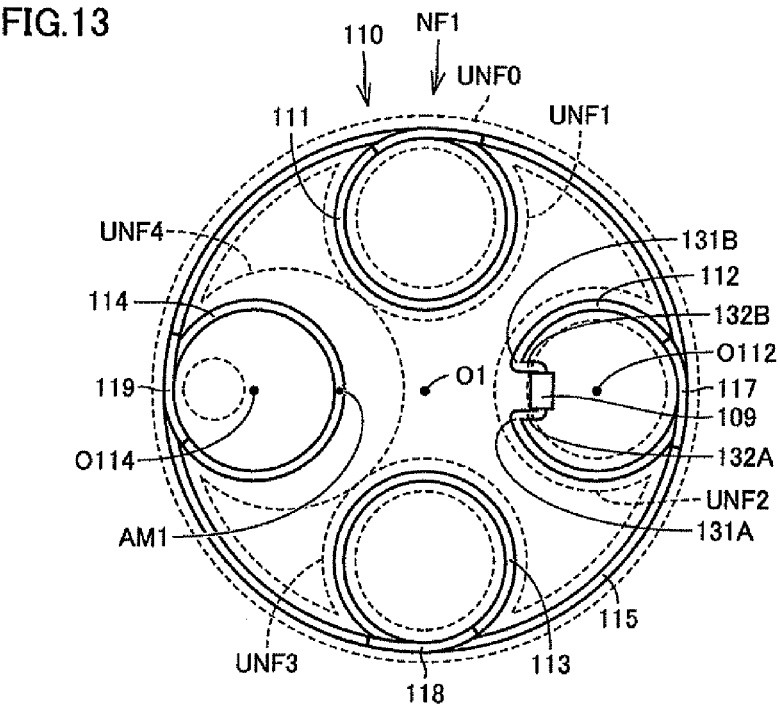
FIG. 13 is a plan view of vehicle resonant coil 110 when electromagnetic field resonant coupling is established between vehicle resonant coil 110 and a facility resonant coil 240.

FIG. 13 is a plan view of vehicle resonant coil 110 when electromagnetic field resonant coupling is established between vehicle resonant coil 110 and facility resonant coil 240. In FIG. 13, the broken line schematically represents the near field where the intensity of the magnetic field is high.

When electric magnetic field resonant coupling is established between vehicle resonant coil 110 and facility resonant coil 240, AC current having a frequency equal to the resonant frequency flows to vehicle resonant coil 110. Accordingly, near field NF1 is developed around vehicle resonant coil 110. Near field NF1 includes a unit near field UNF0 formed around outer side coil 115 and unit near fields UNF1-UNF4 formed around inner side coils 111-114, respectively.

Inner side coils 111, 112, 113 and 114 are arranged equally spaced along the circumference of winding center line O1, and symmetric to each other about winding center line O1. The length of the coil wire constituting inner side coils 111, 112, 113 and 114 is substantially the same. Outer side coil 115 is also formed symmetrically about winding center line O1. Ends 131A and 131B of vehicle resonant coil 110 are formed at inner side coil 112. Furthermore, the length of connection wirings 132A and 132B is substantially the same.

Since end 131B and connection wiring 132A of vehicle resonant coil 110 are provided at inner side coil 112, anti-node AM1 is located at inner side coil 114 symmetric to inner side coil 112 about winding center line O1. It is appreciated that, around anti-node AM1 located at inner side coil 114, a near field of high magnetic field intensity is developed over a range wider than the range of other regions.

Inner side coil 114 is located within a region surrounded by outer side coil 115. Therefore, a magnetic field of high intensity, even if developed around anti-node AM1, can be prevented from spreading over a wide range as far as outside vehicle resonant coil 110. Ends 131A and 131B at inner side coil 112 are located closer to winding center line O1 than winding center line O112 of inner side coil 112. Therefore, anti-node AM1 at inner side coil 114 is located closer to winding center line O1 than winding center line O114 of inner side coil 114. Accordingly, a magnetic field of high intensity developed surround anti-node AM1 can be prevented from spreading over a wide range as far as outside vehicle resonant coil 110.

In the example shown in FIG. 13 and the like, anti-node AM1 is located at a region of inner side coil 114 closest to winding center line O1.

Figure 14:
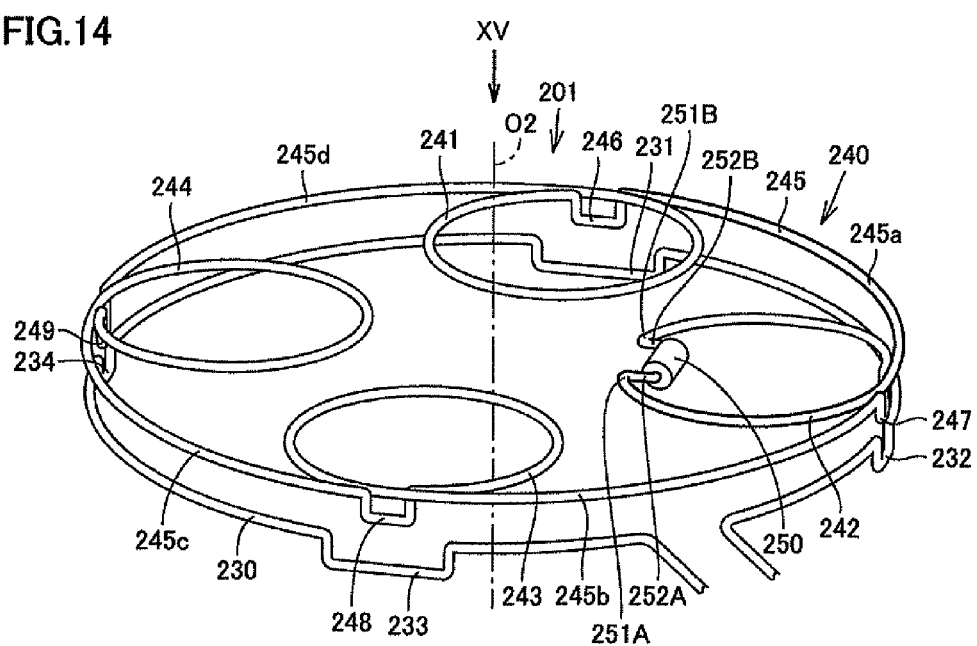
FIG. 14 is a perspective view schematically representing a facility coil unit 201.
Figure 15:
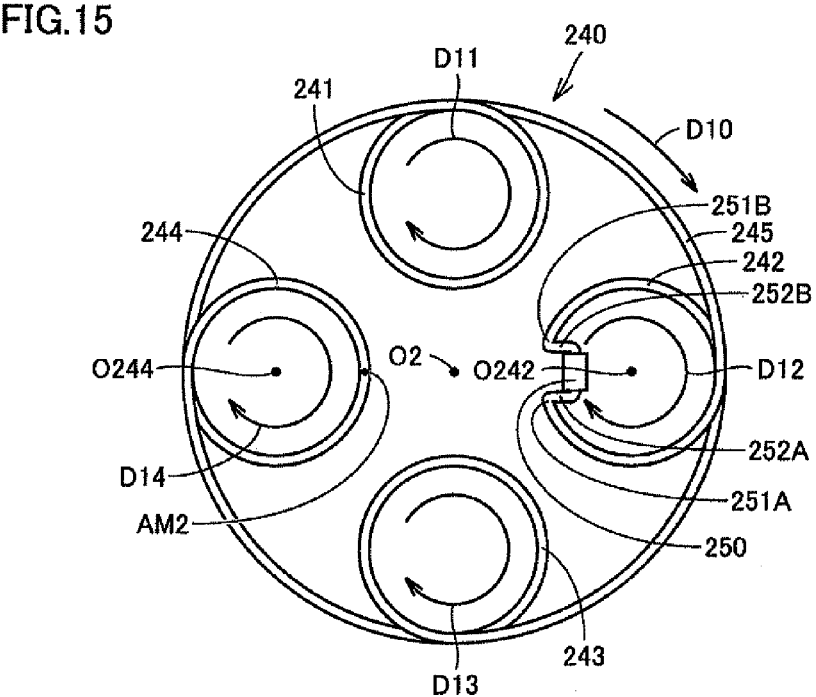
FIG. 15 is a plan view of a facility electromagnetic induction coil 230 and facility resonant coil 240 when viewed from the direction of XV shown in FIG. 14.

FIG. 14 is a perspective view schematically representing facility coil unit 201. FIG. 15 is a plan view of facility electromagnetic induction coil 230 and facility resonant coil 240 when viewed from the direction of XV indicated in FIG. 14.

As shown in FIGS. 14 and 15, facility coil unit 201 includes a facility resonant coil 240, a facility electromagnetic induction coil 230 arranged below facility resonant coil 240, a facility capacitor 250 connected to facility resonant coil 240, and connection wirings 252A and 252B connecting facility capacitor 250 and facility resonant coil 240.

Facility resonant coil 240 includes ends 251A and 251B. Connection wiring 252A is connected to end 251A. Connection wiring 252B is connected to end 251B. Connection wirings 252A and 252B are formed by bending a coil wire constituting facility resonant coil 240 at end 251A and end 251B.

Facility resonant coil 240 is formed to take a shape substantially identical to that of vehicle resonant coil 110. Facility resonant coil 240 includes an outer side coil 245, a plurality of inner side coils 241, 242, 243 and 244 arranged at the inner side of outer side coil 245, and crossovers 246, 247, 248 and 249 connecting outer side coil 245 with inner side coils 241, 242, 243 and 244, respectively. The winding center line of each of inner side coils 241, 242, 243 and 244 are arranged equally spaced along a circumference of winding center line O2.

Facility resonant coil 240 is also formed of one conductor wire, likewise with vehicle resonant coil 110. Therefore, facility electromagnetic induction coil 230 and the like effecting transfer of electric power with facility resonant coil 240 can be consolidated into one, allowing the device to be simplified.

In FIG. 15, when viewing facility resonant coil 240 and facility electromagnetic induction coil 230 in the direction towards the center point of facility resonant coil 240 from a point along winding center line O2, facility electromagnetic induction coil 230 is provided so as to overlap with outer side coil 245. Therefore, the transfer of electric power between facility resonant coil 240 and facility electromagnetic induction coil 230 can be carried out efficiently.

In FIG. 15, outer side coil 245 includes arcs 245*a*, 245*b*, 245*c* and 245*d* taking an arc shape, extending about winding center O2. By crossovers 246, 247, 248 and 249, arcs 245*a*, 245*b*, 245*c* and 245*d* are connected with inner side coils 241, 242, 243 and 244.

Similarly in the example of FIG. 15, crossovers 246, 247, 248 and 249 are formed to bridge over a portion of facility resonant coil 240, and bent to bulge towards facility electromagnetic induction coil 230.

As shown in FIG. 14, facility electromagnetic induction coil 230 includes bent sections 231, 232, 233 and 234 bending to comply with the shape of crossovers 246, 247, 248 and 249 to prevent the generation of electric discharge between facility electromagnetic induction coil 230 and facility resonant coil 240.

Furthermore, by setting the distance between facility electromagnetic induction coil 230 and facility resonant coil 240 constant, electromotive force can be generated favorably at facility electromagnetic induction coil 230, allowing the transfer efficiency of electric power between facility electromagnetic induction coil 230 and facility resonant coil 240 to be improved.

When current flows in current direction D10 in FIG. 15 at outer side coil 245, current flows in current directions D11, D12, D13 and D14 at inner side coils 241, 242, 243 and 244, respectively. Therefore, the direction of the magnetic field developed by outer side coil 245 matches the direction of the magnetic field developed by each of inner side coils 241, 242, 243 and 244.

Inner side coils 241, 242, 243 and 244 are arranged symmetrically about winding center line O2. When electric power is transferred from facility coil unit 201 to vehicle coil unit 101, AC current having a frequency equal to the resonant frequency flows to facility resonant coil 240.

The anti-node of the aforementioned AC current is located at the middle area in the length direction of the conductor wire constituting facility resonant coil 240, connection wiring 252A, connection wiring 252B, and facility capacitor 250. The length of the two electrodes constituting facility capacitor 250 is substantially equal. Moreover, the length of connection wiring 252A and connection wiring 252B is substantially equal. Therefore, the anti-node of the aforementioned AC current is located at the middle area in the length direction of the coil wire constituting facility resonant coil 240. The region of facility resonant coil 240 corresponding to the anti-node of the AC current is referred to as anti-node AM2.

Figure 16:
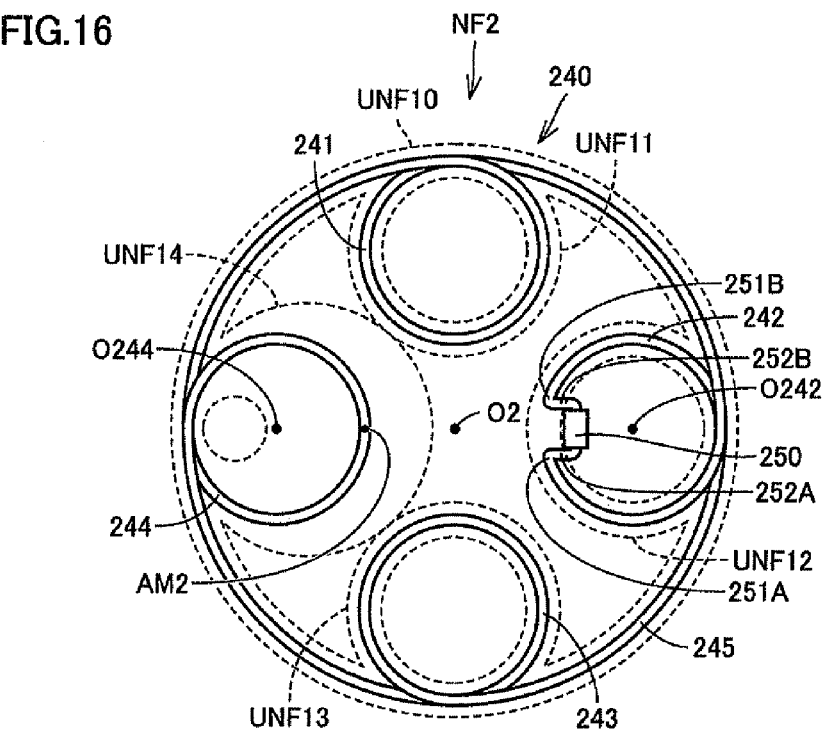
FIG. 16 is a plan view of facility resonant coil 240 when a current of resonant frequency flows through facility resonant coil 240.

FIG. 16 is a plan view of facility resonant coil 240 when current of a resonant frequency flows to facility resonant coil 240. The broken line shown in FIG. 16 represents the region of high magnetic field intensity among the near field developed around facility resonant coil 240.

The flow of a current having a resonant frequency to facility resonant coil 240 causes near field NF2 to be developed around facility resonant coil 240. Near field NF2 includes a unit near field UNF10 developed around outer side coil 245, and unit near fields UNF11, UNF12, UNF13 and UNF14 developed around inner side coils 241, 242, 243 and 244, respectively.

It is appreciated that a magnetic field of high intensity is developed around anti-node AM2 at a range wider than other areas. Anti-node AM2 is located at inner side coil 244. Specifically, anti-node AM2 is located closer to winding center O2 than winding center O244 of inner side coil 244.

Therefore, a magnetic field of high intensity developed around anti-node AM2 can be prevented from spreading over a wide range as far as outside facility resonant coil 240.

Figure 17:
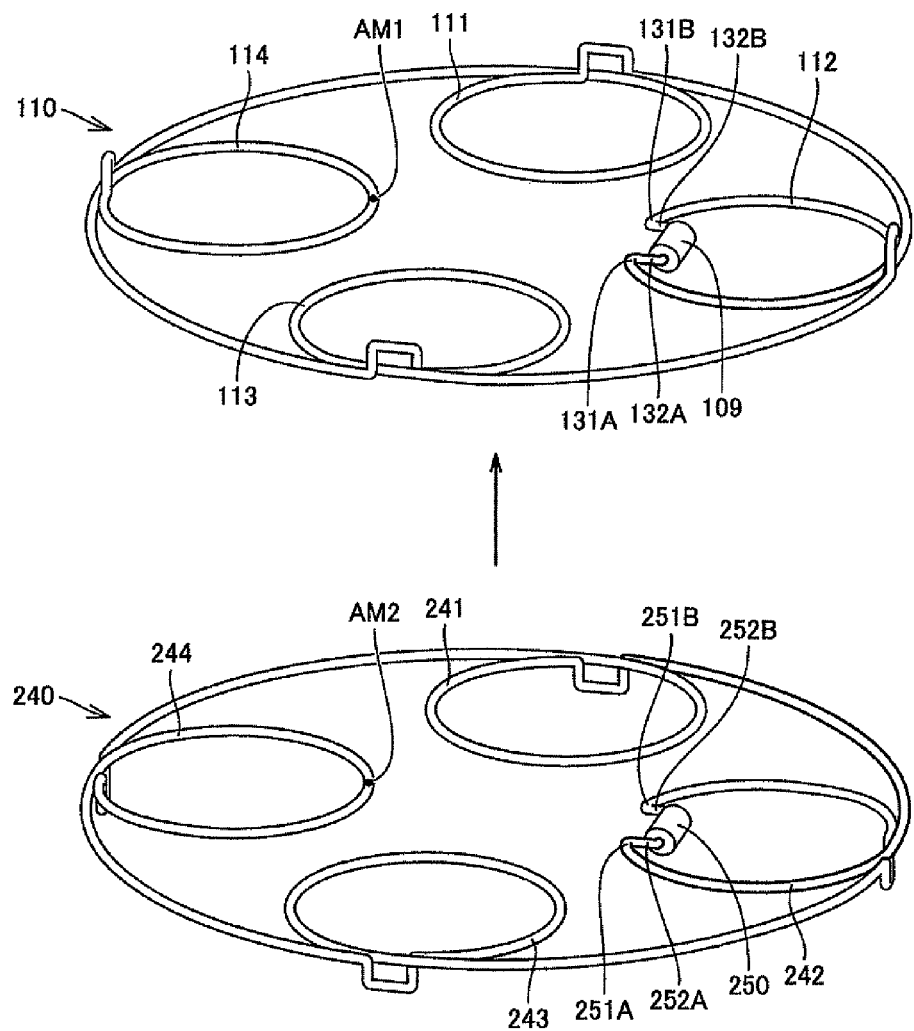
FIG. 17 is a perspective view schematically representing vehicle resonant coil 110 and facility resonant coil 240 during power transfer.

When battery 150 mounted on vehicle 100 is to be charged, vehicle resonant coil 110 is positioned above facility resonant coil 240, as shown in FIG. 17.

A high frequency current of the resonant frequency flows to facility resonant coil 240. Then, near field NF2 is developed around facility resonant coil 240, as shown in FIG. 16.

Figure 18:
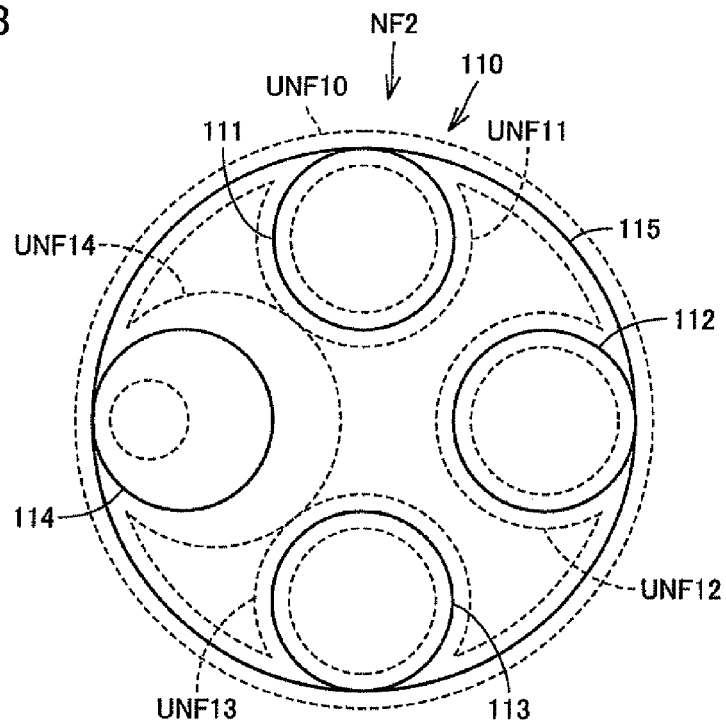
FIG. 18 is a plan view representing the positional relationship between vehicle resonant coil 110 and a near field NF2 in a state where vehicle resonant coil 110 and facility resonant coil 240 are aligned in the vertical direction.

FIG. 18 is a plan representing the positional relationship between vehicle resonant coil 110 and near field NF2 in a state where vehicle resonant coil 110 and facility resonant coil 240 are aligned in the vertical direction.

In the state shown in FIG. 18, vehicle resonant coil 110 is located in near field NF2. Electric power is transmitted favorably from facility resonant coil 240 to vehicle resonant coil 110.

Figure 19:
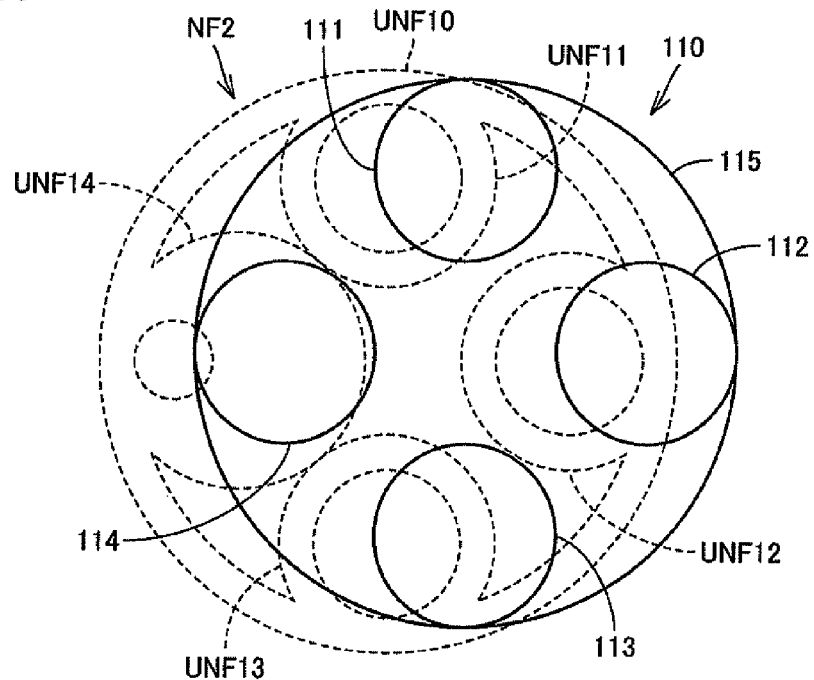
FIG. 19 is a plan view representing a state where vehicle resonant coil 110 is shifted from the position shown in FIG. 18.

FIG. 19 is a plan view representing vehicle resonant coil 110 shifted from the position shown in FIG. 18.

In FIG. 19, vehicle resonant coil 110 is deviated from the proper position shown in FIG. 18. In plan view, vehicle resonant coil 110 crosses near field NF2 at many sites since vehicle resonant coil 110 includes a plurality of inner side coils 111, 112, 113 and 114. Therefore, even if vehicle resonant coil 110 is deviated in position as shown in FIG. 19, the electric power from facility resonant coil 240 is transmitted to vehicle resonant coil 110, suppressing reduction in the transmission efficiency of electric power.

Furthermore, since a plurality of inner side coils 111, 112, 113 and 114 are arranged at the inner side of outer side coil 115, increase in the size of vehicle resonant coil 110 per se can be suppressed.

According to vehicle coil unit 101 and facility coil unit 201 according to the present embodiment, leakage of a magnetic field of high intensity over a wide range as far as outside each resonant coil can be suppressed, and reduction in the efficiency of power transmission and power reception can be suppressed even if vehicle resonant coil 110 and facility resonant coil 240 are deviated in position.

The inventors of the present application devised the mounting manner of vehicle resonant coil 110 and facility resonant coil 240 to suppress leakage of a magnetic field of high intensity around vehicle 100. Details thereof will be described hereinafter with reference to the drawings.

Figure 20:
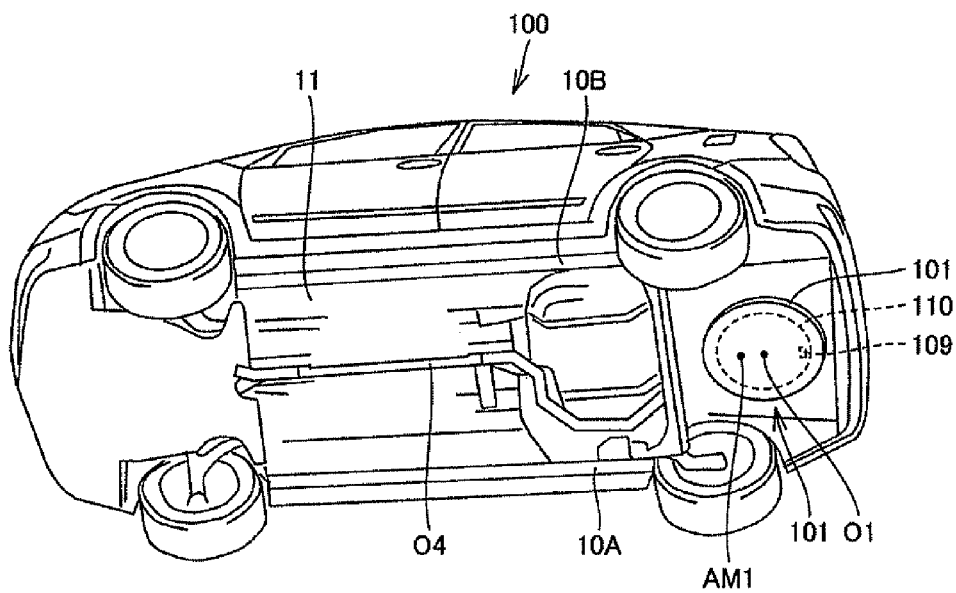
FIG. 20 is a perspective view of the lower surface of vehicle 100.
Figure 21:
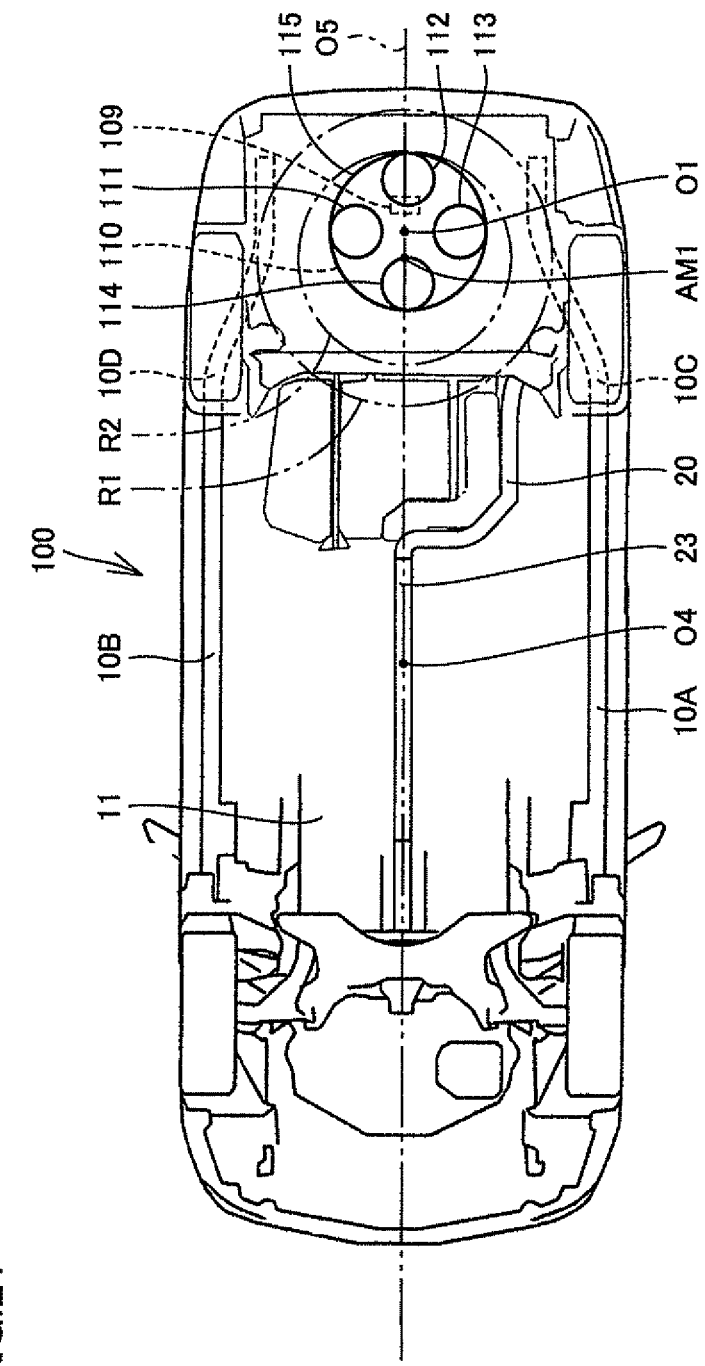
FIG. 21 is a bottom view of vehicle 100 shown in FIG. 21.
Figure 22:
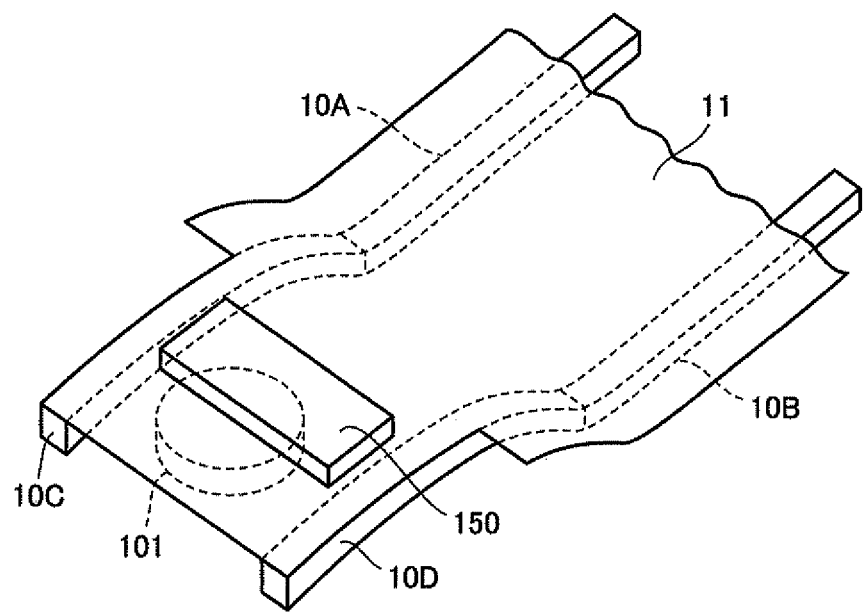
FIG. 22 is a perspective view of a floor panel 11 and vehicle coil unit 101 of an electrical powered vehicle.

FIG. 20 is a perspective view representing a bottom surface of vehicle 100. FIG. 21 is a bottom view of vehicle 100, representing the arranged position of vehicle resonant coil 110. FIG. 22 is a perspective view of a floor panel 11 and vehicle coil unit 101 of an electrical powered vehicle.

In FIGS. 20 and 21, inner side coil 114 is located at the middle along the width direction of electrical powered vehicle 100. Among inner side coils 111-114, inner side coil 114 is arranged closest to a center point O4 of electrical powered vehicle 100. In other words, vehicle resonant coil 110 is arranged such that the distance between anti-node AM1 and center point O4 of vehicle 100 becomes smaller than the distance between winding center line O1 and center point O4. Regions R1 and R2 in FIG. 21 is where the magnetic field has high intensity. Since anti-node AM1 is arranged close to the center of vehicle 100, leakage of regions R1 and R2 of high intensity, developed around anti-node AM1, towards the surrounding area of vehicle 100 is suppressed.

Anti-node AM1 is arranged at the middle in the width direction of vehicle 100, allowing the magnetic field of high intensity developed around anti-node AM1 to be prevented from leaking through the side face of vehicle 100.

Since anti-node AM1 is located within a region surrounded by outer side coil 115, leakage of a magnetic field of high intensity can be suppressed from leaking around electrical powered vehicle 100, even if vehicle resonant coil 110 is mounted on electrical powered vehicle 100 in a state rotated from a predetermined position. For example, even when vehicle resonant coil 110 is mounted in a state rotated 90° from the state shown in FIG. 21, the distance between anti-node AM1 and the side face of electrical powered vehicle 100 is ensured, allowing leakage of a magnetic field of high intensity from the side face of electrical powered vehicle 100 to be suppressed.

In the example shown in FIG. 21, anti-node AM1 is arranged on a center line O5 that extends in the longitudinal direction of vehicle 100, and that passes through the middle of vehicle 100 in the width direction. However, anti-node AM1 is not limited to that position, and may be arranged at any position on and in the proximity of center line O5.

Referring to FIGS. 20-22, vehicle 100 includes a pair of side members 10A and 10B arranged in the width direction of the vehicle, a pair of rear side members 10C and 10D arranged in the width direction of the vehicle, and a floor panel 11. Floor panel 11 is fixed to the top face of side members 10A and 10B and to the top face of rear side members 10C and 10D. Vehicle coil unit 101 is provided at the lower face of floor panel 11.

As shown in FIGS. 21 and 22, rear side member 10C is connected to the trailing end of side member 10A, whereas rear side member 10D is connected to the trailing end of side member 10B. Viewing vehicle coil unit 101 and rear side members 10C and 10D from above, vehicle coil unit 101 is arranged between rear side members 10C and 10D.

As shown in FIG. 22, vehicle coil unit 101 is arranged between rear side member 10C and rear side member 10D, which protrude from the lower face of floor panel 11. Rear side member 10C and rear side member 10D serve to prevent the magnetic field of high intensity from leaking outside.

Further, by arranging vehicle coil unit 101 between rear side members 10C and 10D, protection of vehicle coil unit 101 can be afforded even if vehicle 100 receives side collision. It is particularly preferable to arrange vehicle resonant coil 110 such that anti-node AM1 is located between the pair of rear wheels arranged in the width direction. The rear wheels serve to prevent the magnetic field developed around anti-node AM1 from leaking towards the surrounding area of the vehicle and to protect vehicle coil unit 101 from external collision.

Since battery 150 is arranged between rear side members 10C and 10D at floor panel 11, the distance of the wiring between vehicle coil unit 101 and battery 150 can be shortened.

Figure 23:
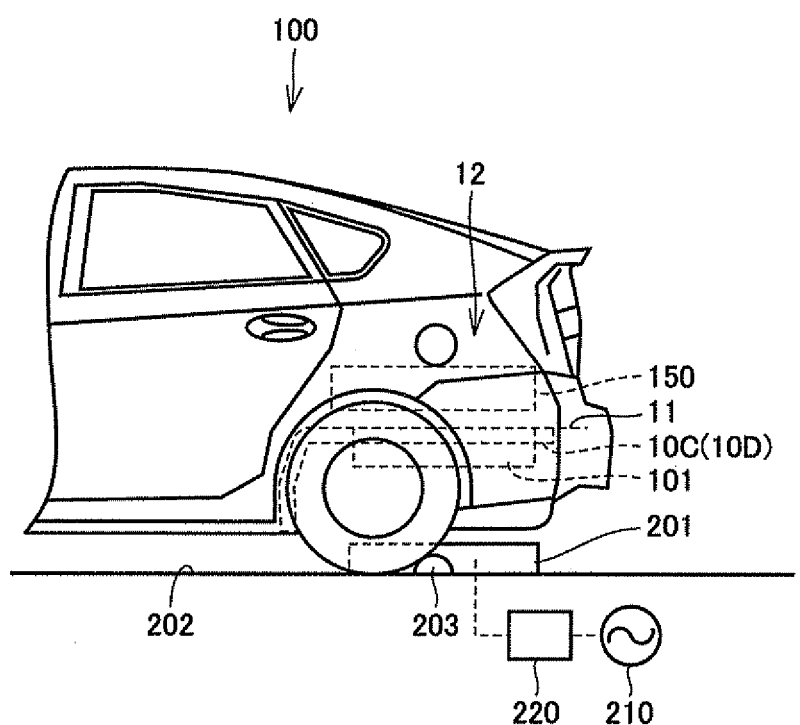
FIG. 23 is a partial side view representing the manner when vehicle 100 is parked at a predetermined position in parking space 202.

Next, facility coil unit 201 of external power feeding apparatus 200 will be described in detail. FIG. 23 is a partial side view of vehicle 100 parked at a predetermined position in parking space 202.

As shown in FIG. 23, a wheel block 203 for stopping the rear wheel of vehicle 100 is provided at parking space 202. By stopping vehicle 100 such that the rear wheel abuts against wheel block 203, vehicle 100 is parked at the predetermined position in parking space 202.

When vehicle 100 parks at the predetermined position in parking space 202, facility coil unit 201 is located facing vehicle coil unit 101 in the vertical direction.

As shown in FIG. 17, anti-node AM1 and anti-node AM2 face each other in the height direction. Therefore, the magnetic field of high intensity developed around anti-node AM2 can be prevented from leaking outside from the area between the vehicle and the ground. Furthermore, the arrangement of antinodes AM1 and AM2 in the height direction allows the degree of coupling between vehicle resonant coil 110 and facility resonant coil 240 to be improved, allowing the power transmission efficiency and power reception efficiency to be increased.

Particularly, since antinodes AM1 and AM2 are located in a region surrounded by outer side coils 115 and 245, respectively, the magnetic field of high intensity developed around anti-node AM2 can be prevented from leaking outside from the area between the vehicle and the ground during electric power transmission. Furthermore, even if vehicle resonant coil 110 and facility resonant coil 240 are arranged in a state relatively rotated to each other, the transmission efficiency between vehicle resonant coil 110 and facility resonant coil 240 can be increased since the distance between anti-nodes AM1 and AM2 is short.

Although vehicle resonant coil 110 according to the present embodiment has a plurality of inner side coils 111-113 provided in addition to inner side coil 114 where anti-node AM1 is located, inner side coils 111-113 are not necessarily essential constituent elements.

In other words, only inner side coil 114 where anti-node AM1 is located may be provided such that anti-node AM1 is located within a region surrounded by outer side coil 115. In this case, vehicle capacitor 109 is typically located on outer side coil 115.

Similarly on part of facility resonant coil 240, inner side coils 241-243 other than inner side coil 244 where anti-node AM2 is located are not necessarily essential constituent elements.

The provision of inner side coils 111-113 and inner side coils 241-243 allows, even if vehicle resonant coil 110 and facility resonant coil 240 are deviated in position relatively as set forth above, the overlapping area to be increased. Therefore, reduction in the transmission efficiency can be suppressed.

In the embodiment set forth above, inner side coil 114 is formed located within a region surrounded by outer side coil 115 such that anti-node AM1 is located within a region surrounded by outer side coil 115. Vehicle resonant coil 110 is formed such that anti-node AM1 is located at inner side coil 114.

Thus, inner side coil 114 is provided such that anti-node AM1 is located within a region surrounded by outer side coil 115 in the above-described embodiment.

However, formation of a coil in a loop such as the inner side coil is dispensable as means for arranging anti-node AM1 within a region surrounded by outer side coil 115. An extension may be formed extending from outer side coil 115 into a region surrounded by outer side coil 115, and form vehicle resonant coil 110 such that anti-node AM1 is located on the extension.

In the case where inner side coil 114 is formed at vehicle resonant coil 110 as the means for arranging anti-node AM1 within a region surrounded by outer side coil 115, reduction in the transmission efficiency can be suppressed even if the location of vehicle resonant coil 110 and facility resonant coil 240 is relatively deviated.

Similarly on part of facility resonant coil 240, an extension extending from outer side coil 245 into a region surrounded by outer side coil 245 may be formed, absent of the aforementioned inner side coils, and form facility resonant coil 240 such that anti-node AM2 is located at the extension.

Although the embodiment of the present invention has been described as set forth above, it is to be understood that the embodiment disclosed herein is illustrative and non-restricted in every respect. The scope of the present invention is defined by the terms of claims, and is intended to include any modification within the scope and meaning equivalent to the terms of the claims. Furthermore, the numeric values and the like set forth above are by way of example, and not limited to the aforementioned numeric value and range.

INDUSTRIAL APPLICABILITY

The present invention is applicable to a coil unit, a power transmission device, an external power feeding apparatus, and a vehicle charging system.

REFERENCE SIGNS LIST 10A, 10B side member; 10C, 10D, rear side member; 11 floor panel; 100 vehicle; 101 vehicle coil unit; 109 vehicle capacitor; 110 vehicle resonant coil; 111, 112, 113, 114, 241, 242, 243, 244 inner side coil; 115, 245 outer side coil; 120 vehicle electromagnetic induction coil; 130 rectifier; 131A, 131A, 251A, 251B end; 134, 135 electrode; 140 converter; 150 battery; 160 power control unit; 170 motor unit; 200 external power feeding apparatus; 201 facility coil unit; 202 parking space; 203 wheel block; 210 AC source; 220 high frequency power driver; 230 facility electromagnetic induction coil; 240 facility resonant coil; 250 facility capacitor; AM1, AM2 anti-node; C capacitance; O1, O2, O112, O114, O244 winding center line; O4 center point; O5 center line.

The invention claimed is:

1. A coil unit comprising:
  a resonant coil establishing an electromagnetic field resonant coupling with an externally provided external resonant coil,
  said resonant coil including an outer side coil extending along a circumference of a first winding center and centered at about said first winding center, and an extension extending from said outer side coil into a region surrounded by said outer side coil,
  said resonant coil, which is formed such that an anti-node of the resonant coil that is an area of an anti-node of AC current flowing through said resonant coil, is located at said extension when the electromagnetic field resonant coupling is established between said external resonant coil and said resonant coil.

2. The coil unit according to claim 1, wherein
  said resonant coil includes an inner side coil formed in a loop, whose direction of a magnetic field developed by a flow of current is identical to the direction of the magnetic field developed by said outer side coil, and
  said extension is said inner side coil.

3. The coil unit according to claim 2, wherein
  a plurality of said inner side coils are provided spaced apart along said outer side coil, and
  said anti-node is located at one of said plurality of inner side coils.

4. The coil unit according to claim 2, wherein
  said inner side coil extends along a circumference of a second winding center,
  said second winding center is located at a position distant from said first winding center, and
  said resonant coil is formed such that said anti-node is located closer to said first winding center than said second winding center.

5. The coil unit according to claim 1, wherein said resonant coil includes a first end and a second end,
  further comprising a capacitor connected to said first and second ends,
  wherein said anti-node is located at a middle of a conductor wire constituting said resonant coil in a length direction from one end to the other end of the conductor wire.

6. The coil unit according to claim 5, wherein
  said resonant coil includes an inner side coil formed in a loop, whose direction of a magnetic field developed by a flow of current is identical to the direction of the magnetic field developed by said outer side coil,
  a plurality of said inner side coils are provided spaced apart along said outer side coil, and
  said plurality of the inner side coils include a first inner side coil where the anti-node of said resonant coil is located, and a second inner side coil including said first end and second end, and to which said capacitor is connected.

7. The coil unit according to claim 5, wherein
  said resonant coil and said capacitor constitute a resonant circuit, and
  said anti-node is located at a middle of a current path of said resonant circuit.

8. The coil unit according to claim 1, further comprising an electromagnetic induction coil coupled with said resonant coil in an electromagnetic induction manner.

9. A vehicle including the coil unit defined in claim 1, wherein a distance between the anti-node of said resonant coil and the center of said vehicle is smaller than the distance between said first winding center and the center of said vehicle.

10. An external power feeding apparatus comprising the coil unit defined in claim 1.

11. A vehicle power charging system comprising:
  a vehicle including a coil unit, the coil unit including a resonant coil establishing an electromagnetic field resonant coupling with an external resonant coil provided externally to said vehicle,
  said resonant coil including an outer side coil extending along a circumference of a first winding center and centered at about said first winding center, and an extension extending from said outer side coil into a region surrounded by said outer side coil,
  said resonant coil, which is formed such that an anti-node of the resonant coil that is an area of an anti-node of AC current flowing through said resonant coil, is located at said extension when the electromagnetic field resonant coupling is established between said external resonant coil and said resonant coil, wherein a distance between the anti-node of said resonant coil and a center of said vehicle is smaller than a distance between said first winding center and the center of said vehicle, and
  an external power feeding apparatus including the coil unit.

* * * * *